United States Patent
Wang

(10) Patent No.: US 8,605,106 B2
(45) Date of Patent: Dec. 10, 2013

(54) PROJECTOR AND COLOR IMPROVEMENT METHOD OF THE PROJECTOR

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 255 days.

(21) Appl. No.: 13/029,127

(22) Filed: Feb. 17, 2011

(65) Prior Publication Data
US 2012/0062586 A1  Mar. 15, 2012

(30) Foreign Application Priority Data
Sep. 15, 2010 (CN) .......................... 2010 1 0282323

(51) Int. Cl.
G09G 5/02 (2006.01)
G06K 9/00 (2006.01)
G09G 5/00 (2006.01)

(52) U.S. Cl.
USPC ............ 345/589; 345/581; 382/167; 382/162

(58) Field of Classification Search
None
See application file for complete search history.

(56) References Cited

U.S. PATENT DOCUMENTS

| 7,050,114 | B2* | 5/2006 | Stessen et al. | 348/679 |
| 7,462,237 | B2* | 12/2008 | Specht et al. | 117/1 |
| 7,949,202 | B2* | 5/2011 | Matsuda | 382/275 |
| 2006/0007239 | A1* | 1/2006 | Harrison | 345/590 |
| 2011/0285713 | A1* | 11/2011 | Swic et al. | 345/428 |

* cited by examiner

*Primary Examiner* — Ulka Chauhan
*Assistant Examiner* — Saptarshi Mazumder
(74) *Attorney, Agent, or Firm* — Altis Law Group, Inc.

(57) ABSTRACT

A method improves color of projected images using a projector. The method calculates a first improvement factor, a second improvement factor and a third improvement factor, divides an original image into a red picture, a green picture and a blue picture. The method multiplies a pixel value of each pixel point of the red picture by the first improvement factor to obtain an improved red picture, multiplies a pixel value of each pixel point of the green picture by the second improvement factor to obtain an improved green picture, and multiplies a pixel value of each pixel point of the red picture by the third improvement factor to obtain an improved blue picture. The method combines the improved red, green and blue pictures to generate a combined image, and projects the combined image on a projection area to obtain the projected image having similar color to the original image.

9 Claims, 5 Drawing Sheets

PROJECTOR AND COLOR IMPROVEMENT METHOD OF THE PROJECTOR

BACKGROUND

1. Technical Field

Embodiments of the present disclosure relate to optical devices and adjustment methods of the optical devices, and particularly to a projector and a method for improving color of a projected image using the projector.

2. Description of Related Art

Projectors, such as projection-type image display apparatus, have high image quality and can be produced at low cost, and have been used in a variety of applications. Therefore, the color reproducibility and image quality of a projector have been more important factors depending on the application in which the projector is used. Since an image projected by the projector suffers from color unevenness and brightness unevenness, it is important to precisely improve the image quality of the projected image, for example, decrease a color difference between the original image with the projected image.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
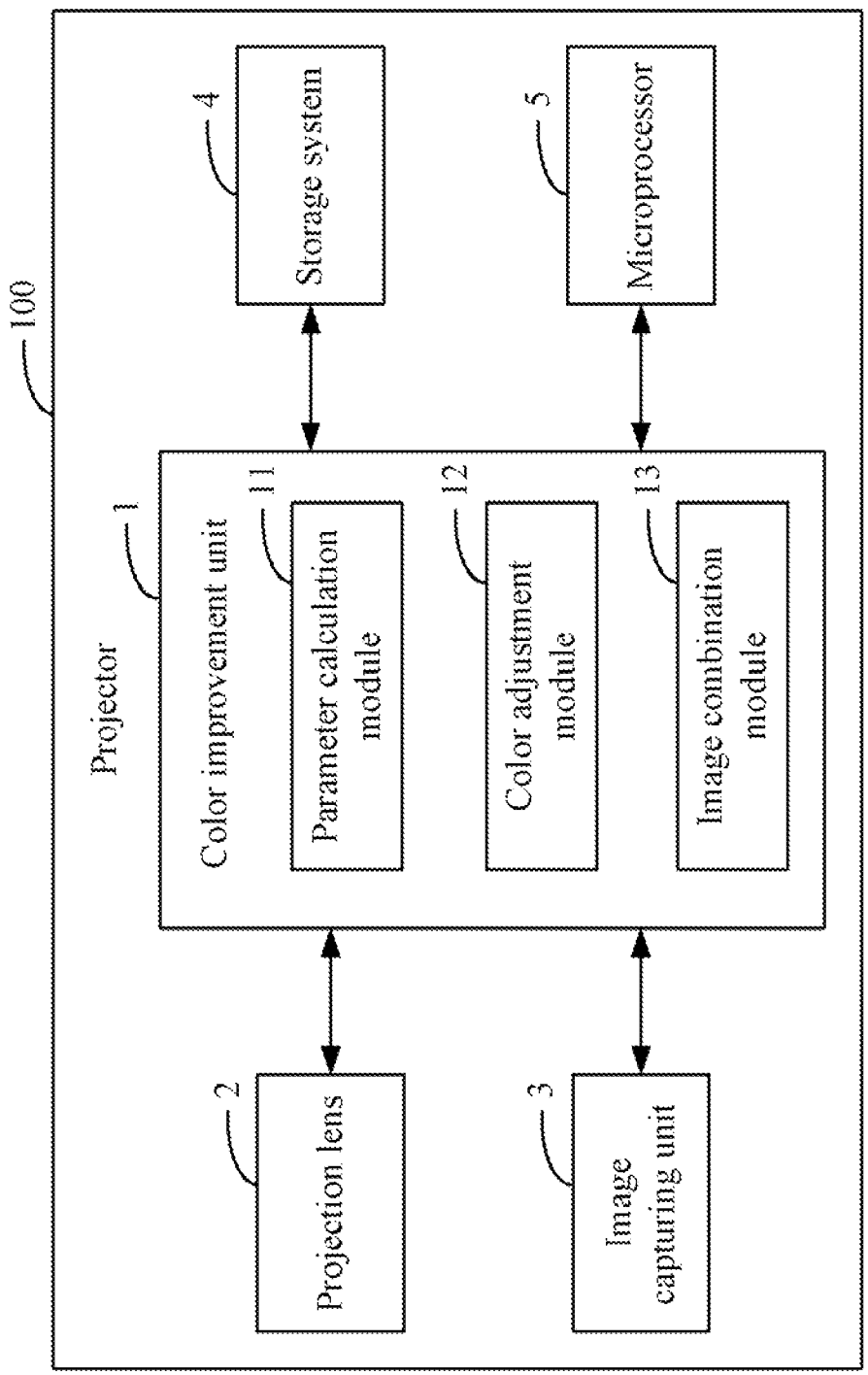
FIG. 1 is a block diagram of one embodiment of a projector.

FIG. 1 is a block diagram of one embodiment of a projector 100. In the embodiment, the projector 100 includes a color improvement unit 1, a projection lens 2, an image capturing device 3, a storage system 4, and a least one microprocessor 5. It should be understood that FIG. 1 illustrates only one example of the projector 100, and may include more or fewer components than illustrated, or a different configuration of the various components in other embodiments.

In one embodiment, the color improvement unit 1 may comprise computerized code in the form of one or more programs that are stored in the storage system 4 and executed by the at least one microprocessor 5. When the projector 100 projects an original image on a projection area, such as a wall surface or a display screen, the color improvement unit 1 can automatically compensate a color difference between the original image and the projected image, so as to obtain the projected image having the similar color to the original image.

The projection lens 2 is an optical lens which is operable to project the original picture on the projection area. The image capturing device 4 is operable to capture images of the projected image from the projection area, and send each of the captured images to the color improvement unit 1 for improvement of the image color. In one embodiment, the image capturing device 4 may be a camera device.

The storage system 4 stores a plurality of original images to be projected by the projector 100. The original images may include black and white images, and color images that include a red image, a green image, and a blue image. In one embodiment, the storage system 4 may be an internal storage device, such as a random access memory (RAM) for temporary storage of information, and/or a read only memory (ROM) for permanent storage of information. In some embodiments, the storage system 4 may also be an external storage device, such as an external hard disk, a storage card, or a data storage medium.

In one embodiment, the color improvement unit 1 includes a parameter calculation module 11, a color adjustment module 12, and an image combination module 13. The modules 11-13 may comprise computerized code in the form of one or more programs that are stored in the storage system 4. The computerized code includes instructions that are executed by the at least one microprocessor 5 to provide functions for implementing the modules 11-13. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The parameter calculation module 11 is operable to calculate a first improvement factor (denoted as Delta_R) for compensating a red difference between the original image and the projected image. The calculation of the first improvement factor Delta_R is described in FIG. 3 as below. The parameter calculation module 11 is further operable to calculate a second improvement factor (denoted as Delta_G) for compensating a green difference between the original image and the projected image. The calculation of the second improvement factor Delta_G is described in FIG. 4 as below. The parameter calculation module 11 is further operable to calculate a third improvement factor (denoted as Delta_B) for compensating a blue difference between the original image and the projected image. The calculation of the third improvement factor Delta_B is described in FIG. 5 as below.

The color adjustment module 12 is operable to obtain an original image from the storage system 4 of the projector 100, and divide the original image into a red picture, a green picture and a blue picture according to an RGB (red, green, and blue) value of each pixel point of the original image. The red picture is a picture whose RGB value is denoted as (R=255, G=0, B=0), the green picture is a picture whose RGB value is denoted as (R=0, G=255, B=0), and the blue picture is a picture whose RGB value is denoted as (R=0, G=0, B=255). The color adjustment module 12 is further operable to multiply a pixel value of each pixel point of the red picture by the first improvement factor Delta_R to obtain an improved red picture, multiply a pixel value of each pixel point of the green picture by the second improvement factor Delta_G to obtain an improved green picture, and multiply a pixel value of each pixel point of the red picture by the third improvement factor Delta_B to obtain an improved blue picture.

The image combination module 13 is operable to combine the improved red picture, the improved green picture and the improvement blue picture to generate a combined image, and project the combined image on the projection area using the projection lens 2 of the projector 100. As such, the projected image has the same color to the original image, so as to improve the image quality of the projected image.

Figure 2:
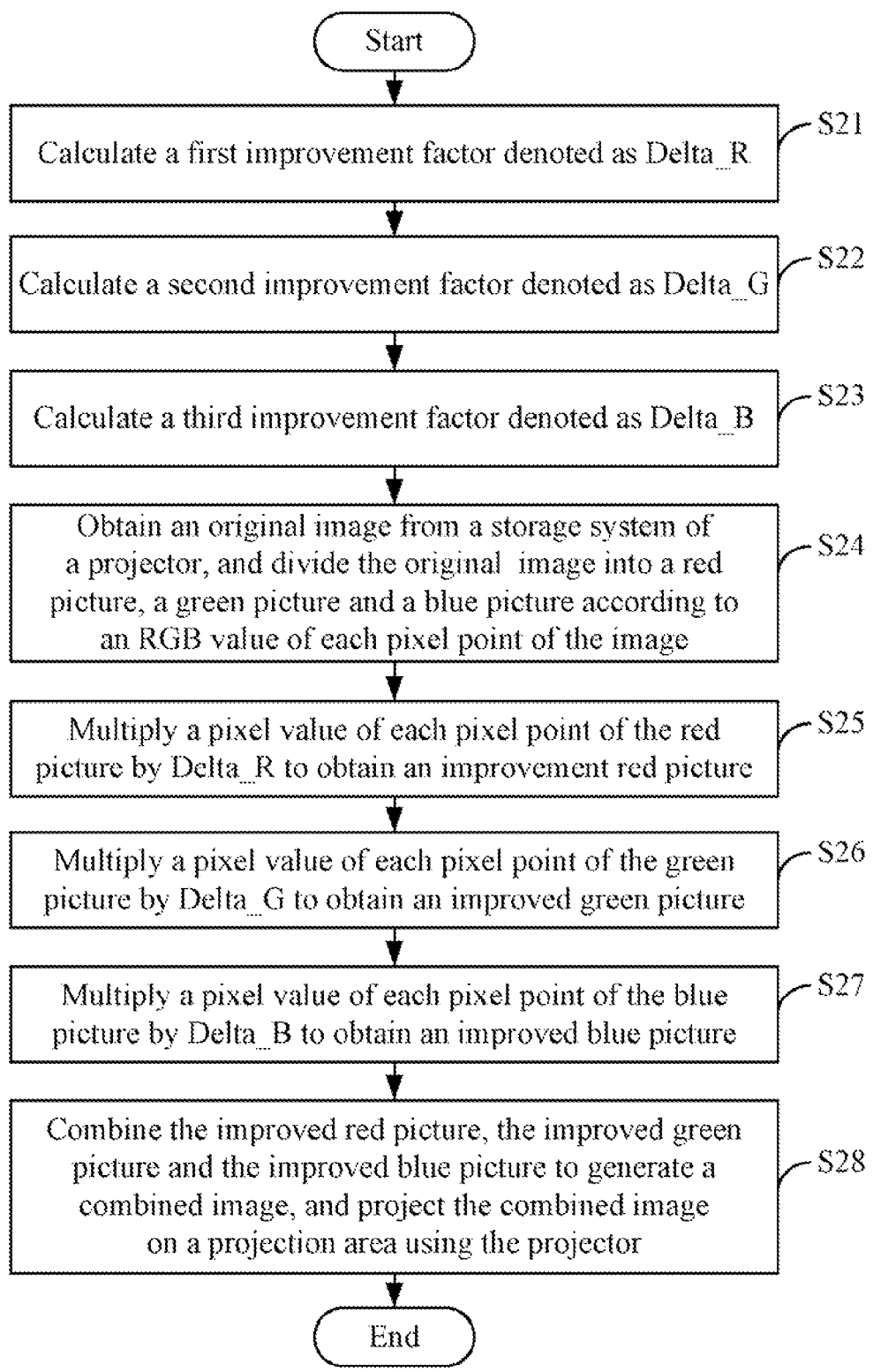
FIG. 2 is a flowchart of one embodiment of a method for improving color of a projected image using the projector of FIG. 1.

FIG. 2 is a flowchart of one embodiment of a method for improving color of a projected image using the projector 100 of FIG. 1. In the embodiment, the method can automatically compensate a color difference between the original image and the projected image, so as to obtain the projected image having the similar color to the original image. Depending on the embodiment, additional blocks may be added, others removed, and the ordering of the blocks may be changed.

In block S21, the parameter calculation module 11 calculates a first improvement factor (denoted as Delta_R) for compensating a red difference between the original image and the projected image. The calculation of the first improvement factor Delta_R is described in FIG. 3 as below.

In block S22, the parameter calculation module 11 calculates a second improvement factor (denoted as Delta_G) for compensating a green difference between the original image and the projected image. The calculation of the second improvement factor Delta_G is described in FIG. 4 as below.

In block S23, the parameter calculation module 11 calculates a third improvement factor (denoted as Delta_B) for compensating a blue difference between the original image and the projected image. The calculation of the third improvement factor Delta_B is described in FIG. 5 as below.

In block S24, the color adjustment module 12 obtains an original image from the storage system 4 of the projector 100, and divides the original image into a red picture, a green picture and a blue picture according to an RGB (red, green, and blue) value of each pixel point of the original image.

In block S25, the color adjustment module 12 multiplies a pixel value of each pixel point of the red picture by the first improvement factor Delta_R to obtain an improved red picture.

In block S26, the color adjustment module 12 multiplies a pixel value of each pixel point of the green picture by the second improvement factor Delta_G to obtain an improved green picture.

In block S27, the color adjustment module 12 multiplies a pixel value of each pixel point of the red picture by the third improvement factor Delta_B to obtain an improved blue picture.

In block S28, the image combination module 13 combines the improved red picture, the improved green picture and the improvement blue picture to generate a combined image, and projects the combined image on the projection area using the projection lens 2 of the projector 100. As such, the projected image has the same color to the original image, so as to improve the image quality of the projected image.

Figure 3:
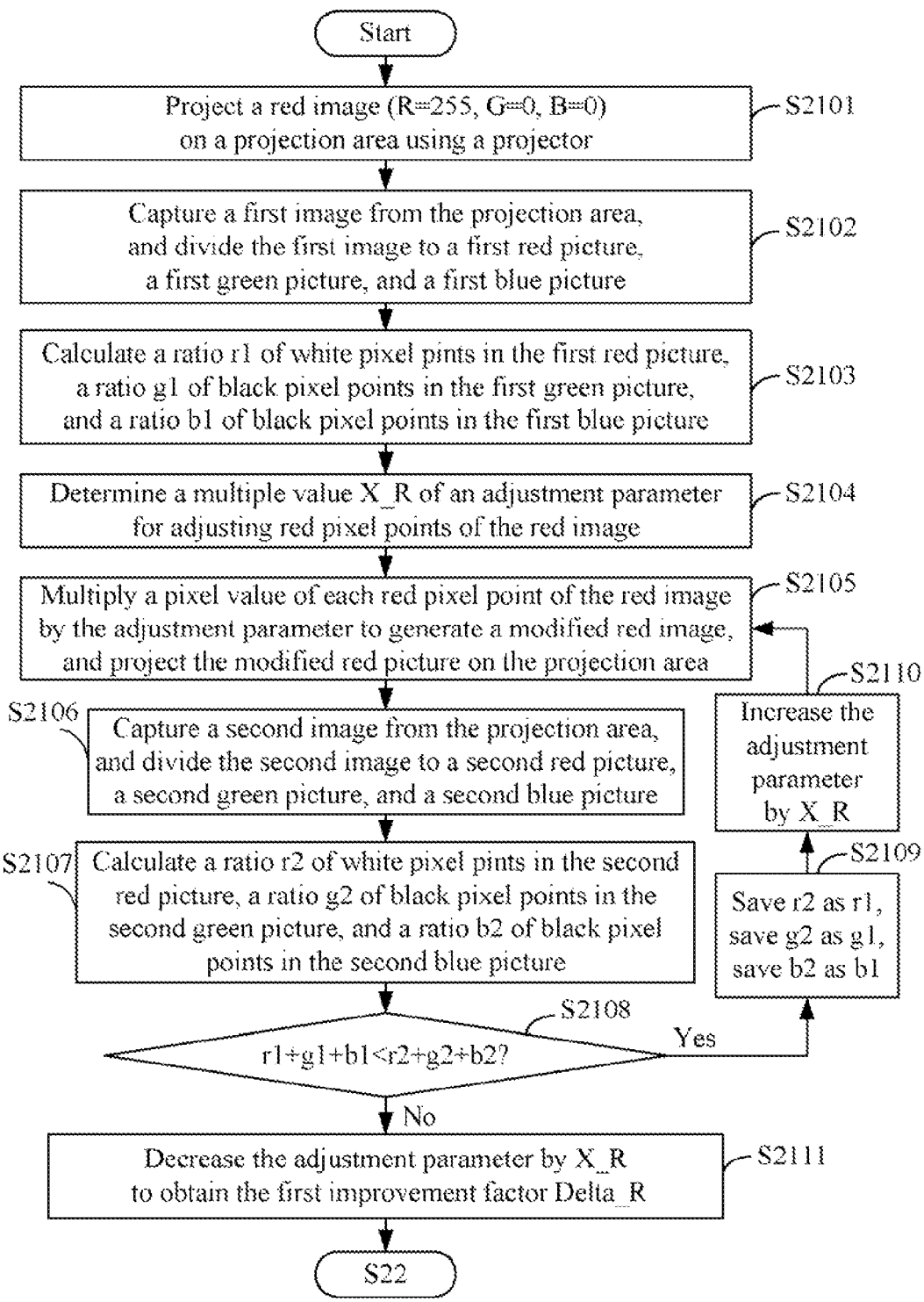
FIG. 3 is a detailed flowchart of block S21 of FIG. 2.

FIG. 3 is a detailed flowchart of block S21 of FIG. 2. In block S2101, the projector 100 reads a red image (R=255, G=0, B=0) from the storage system 4, and projects the red image on the projection area using the projection lens 2 of the projector 100. In block S2102, the image capturing device 4 captures a first image from the projection area, and divides the first image to a first red picture, a first green picture, and a first blue picture.

In block S2103, the parameter calculation module 11 calculates a ratio (denoted as r1) of white pixel points to all pixel points in the first red picture, a ratio (denoted as g1) of black pixel points to all pixel points in the first green picture, and a ratio (denoted as b1) of black pixel points to all pixel points in the first blue picture. In block S2104, the parameter calculation module 11 determines an initial multiple value (denoted as X_R, such as set an initial value X_R=0.1) of a first adjustment parameter for adjusting red pixel points of the red image. In block S2105, the parameter calculation module 11 multiplies a pixel value of each red pixel point of the red image by the first adjustment parameter to generate a modified red image, and projects the modified red image on the projection area by the projection lens 2.

In block S2106, the image capturing device 4 captures a second image from the projection area, and divides the second image to a second red picture, a second green picture, and a second blue picture. In block S2107, the parameter calculation module 11 calculates a ratio (denoted as r2) of white pixel points to all pixel points in the second red picture, a ratio (denoted as g2) of black pixel points to all pixel points in the second green picture, and a ratio (denoted as b2) of black pixel points to all pixel points in the second blue picture.

In block S2108, the parameter calculation module 11 determines whether the sum of r1, g1 and b1 is less than the sum of r2, g2 and b2, i.e., r1+g1+b1<r2+g2+b2. If r1+g1+b1<r2+g2+b2, block S2109 is implemented. Otherwise, if r1+g1+b1>=r2+g2+b2, block S2111 is implemented.

In block S2109, the parameter calculation module 11 saves r2 as r1, saves g2 as g1, and saves b2 as b1. In block S2110, the parameter calculation module 11 increases the first adjustment parameter by the multiple value X_R, and the flows goes to block S2105. In block S2111, the parameter calculation module 11 decreases the first adjustment parameter by the multiple value X_R to obtain the first improvement factor Delta_R.

Figure 4:
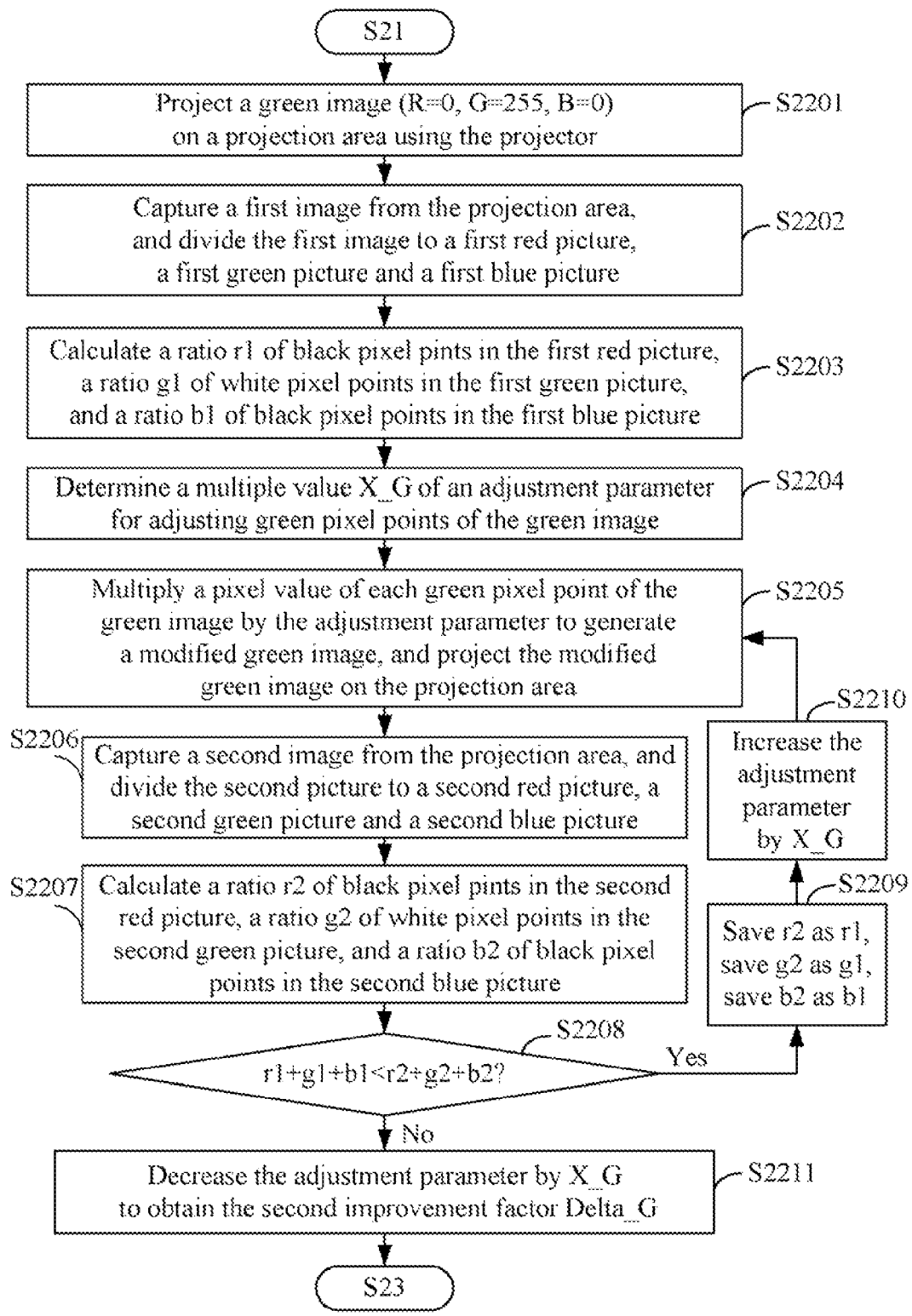
FIG. 4 is a detailed flowchart of block S22 of FIG. 2.

FIG. 4 is a detailed flowchart of block S22 of FIG. 2. In block S2201, the projector 100 reads a green image (R=0, G=255, B=0) from the storage system 4, and projects the green image on the projection area using the projection lens 2 of the projector 100. In block S2202, the image capturing device 4 captures a first image from the projection area, and divides the first image to a first red picture, a first green picture, and a first blue picture.

In block S2203, the parameter calculation module 11 calculates a ratio (denoted as r1) of black pixel points to all pixel points in the first red picture, a ratio (denoted as g1) of white pixel points to all pixel points in the first green picture, and a ratio (denoted as b1) of black pixel points to all pixel points in the first blue picture. In block S2204, the parameter calculation module 11 generates an initial multiple value (denoted as X_G, such as set an initial value X_G=0.1) of a second adjustment parameter for adjusting green pixel points of the green image. In block S2205, the parameter calculation module 11 multiplies a pixel value of each green pixel point of the green image by the second adjustment parameter to generate a modified green image, and projects the modified green image on the projection area by the projection lens 2.

In block S2206, the image capturing device 4 captures a second image from the projection area, and divides the second image to a second red picture, a second green picture, and a second blue picture. In block S2207, the parameter calculation module 11 calculates a ratio (denoted as r2) of black pixel points to all pixel points in the second red picture, a ratio (denoted as g2) of white pixel points to all pixel points in the second green picture, and a ratio (denoted as b2) of black pixel points to all pixel points in the second blue picture.

In block S2208, the parameter calculation module 11 determines whether the sum of r1, g1 and b1 is less than the sum of r2, g2 and b2, i.e., r1+g1+b1<r2+g2+b2. If r1+g1+b1<r2+g2+b2, block S2209 is implemented. Otherwise, if r1+g1+b1>=r2+g2+b2, block S2211 is implemented.

In block S2209, the parameter calculation module 11 saves r2 as r1, saves g2 as g1, and saves b2 as b1. In block S22110, the parameter calculation module 11 increases the second adjustment parameter by the multiple value X_G, and the flows goes to block S2205. In block S2211, the parameter calculation module 11 decreases the second adjustment parameter by the multiple value X_G to obtain the second improvement factor Delta_G.

Figure 5:
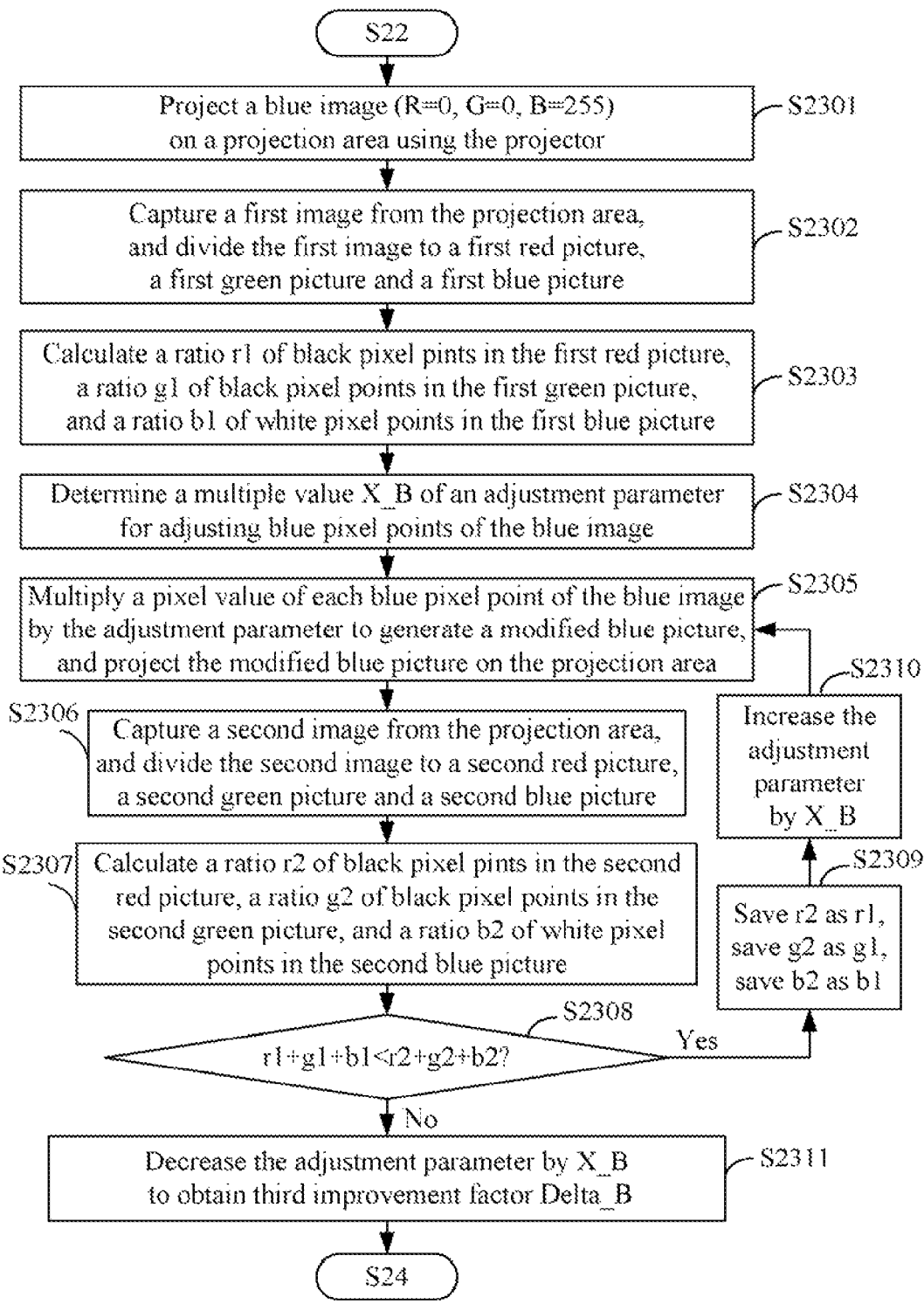
FIG. 5 is a detailed flowchart of block S23 of FIG. 2.

FIG. 5 is a detailed flowchart of block S23 of FIG. 2. In block S2301, the projector 100 reads a blue image (R=0, G=0, B=255) from the storage system 4, and projects the blue image on the projection area using the projection lens 2 of the projector 100. In block S2302, the image capturing device 4 captures a first image from the projection area, and divides the first image to a first red picture, a first green picture, and a first blue picture.

In block S2303, the parameter calculation module 11 calculates a ratio (denoted as r1) of black pixel points to all pixel points in the first red picture, a ratio (denoted as g1) of black pixel points to all pixel points in the first green picture, and a ratio (denoted as b1) of white pixel points to all pixel points in the first blue picture. In block S2304, the parameter calculation module 11 determines an initial multiple value (denoted as X_B, such as set an initial value X_B=0.1) of a second adjustment parameter for adjusting black pixel points of the black image. In block S2305, the parameter calculation module 11 multiplies a pixel value of each blue pixel point of the blue image by the third adjustment parameter to generate a modified blue image, and projects the modified blue image on the projection area by the projection lens 2.

In block S2306, the image capturing device 4 captures a second image from the projection area, and divides the second image to a second red picture, a second green picture, and a second blue picture. In block S2307, the parameter calculation module 11 calculates a ratio (denoted as r2) of black pixel points to all pixel points in the second red picture, a ratio (denoted as g2) of black pixel points to all pixel points in the second green picture, and a ratio (denoted as b2) of white pixel points to all pixel points in the second blue picture.

In block S2308, the parameter calculation module 11 determines whether the sum of r1, g1 and b1 is less than the sum of r2, g2 and b2, i.e., r1+g1+b1<r2+g2+b2. If r1+g1+b1<r2+g2+b2, block S2309 is implemented. Otherwise, if r1+g1+b1>=r2+g2+b2, block S2311 is implemented.

In block S2309, the parameter calculation module 11 saves r2 as r1, saves g2 as g1, and saves b2 as b1. In block S2310, the parameter calculation module 11 increases the third adjustment parameter by the multiple value X_B, and the flows goes to block S2305. In block S2311, the parameter calculation module 11 decreases the third adjustment parameter by the multiple value X_B as to obtain the third improvement factor Delta_B.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A projector, comprising:
    a projection lens, an image capturing device, a storage system, and at least one microprocessor; and
    one or more programs stored in the storage system and executable by the at least one microprocessor, the one or more programs comprising:
    a parameter calculation module operable to calculate a first improvement factor for compensating a red difference between an original image stored in the storage system and a projected image projected by the projector on a projection area, a second improvement factor for compensating a green difference between the original image and the projected image, and a third improvement factor for compensating a blue difference between the original image and the projected image;
    a color adjustment module operable to obtain the original image from the storage system, divide the original image into a red picture, a green picture and a blue picture according to an RGB (red, green, and blue) value of each pixel point of the original image, multiply a pixel value of each pixel point of the red picture by the first improvement factor to obtain an improved red picture, multiply a pixel value of each pixel point of the green picture by the second improvement factor to obtain an improved green picture, and multiply a pixel value of each pixel point of the blue picture by the third improvement factor to obtain an improved blue picture; and
    a combination module operable to combine the improved red picture, the improved green picture and the improvement blue picture to generate a combined image, and project the combined image on the projection area using the projection lens, to obtain the projected image having the similar color to the original image;
    wherein the calculation of the first improvement factor comprises: reading a red image from the storage system, and projecting the red image on the projection area using the projection lens; capturing a first image from the projection area, and dividing the first image to a first red picture, a first green picture, and a first blue picture; calculating a ratio r1 of white pixel points to all pixel points in the first red picture, a ratio g1 of black pixel points to all pixel points in the first green picture, and a ratio b1 of black pixel points to all pixel points in the first blue picture; determining an initial multiple value of an adjustment parameter for adjusting red pixel points of the red image; multiplying a pixel value of each red pixel point of the red image by the adjustment parameter to generate a modified red image, and projecting the modified red image on the projection area by the projection lens; capturing a second image from the projection area, and dividing the second image to a second red picture, a second green picture, and a second blue picture; calculating a ratio r2 of white pixel points to all pixel points in the second red picture, a ratio g2 of black pixel points to all pixel points in the second green picture, and a ratio b2 of black pixel points to all pixel points in the second blue picture; checking whether a sum of the ratios r1, g1 and b1 is less than a sum of the ratios r2, g2 and b2; upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, and increasing the adjustment parameter by the multiple value; upon the condition that the sum of the ratios r1, g1 and b1 is not less than the sum of the ratios r2, g2 and b2, decreasing the adjustment parameter by the multiple value to generate the first improvement factor.

2. The projector according to claim 1, wherein the calculation of the second improvement factor comprises:
    reading a green image from the storage system, and projecting the green image on the projection area using the projection lens;
    capturing a first image from the projection area, and dividing the first image to a first red picture, a first green picture, and a first blue picture;
    calculating a ratio r1 of black pixel points to all pixel points in the first red picture, a ratio g1 of white pixel points to all pixel points in the first green picture, and a ratio b1 of black pixel points to all pixel points in the first blue picture;

determining an initial multiple value of an adjustment parameter for adjusting green pixel points of the green image;

multiplying a pixel value of each green pixel point of the green image by the adjustment parameter to generate a modified green image, and projecting the modified green image on the projection area by the projection lens;

capturing a second image from the projection area, and dividing the second image to a second red picture, a second green picture, and a second blue picture;

calculating a ratio r2 of black pixel points to all pixel points in the second red picture, a ratio g2 of white pixel points to all pixel points in the second green picture, and a ratio b2 of black pixel points to all pixel points in the second blue picture;

checking whether a sum of the ratios r1, g1 and b1 is less than a sum of the ratios r2, g2 and b2;

upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or upon the condition that the sum of the ratios r1, g1 and b1 is not less than the sum of the ratios r2, g2 and b2, decreasing the adjustment parameter by the multiple value to generate the second improvement factor.

3. The projector according to claim 1, wherein the calculation of the third improvement factor comprises:

reading a blue image from the storage system, and projecting the blue image on the projection area using the projection lens;

capturing a first image from the projection area, and dividing the first image to a first red picture, a first green picture, and a first blue picture;

calculating a ratio r1 of black pixel points to all pixel points in the first red picture, a ratio g1 of black pixel points to all pixel points in the first green picture, and a ratio b1 of white pixel points to all pixel points in the first blue picture;

determining an initial multiple value of an adjustment parameter for adjusting blue pixel points of the blue image;

multiplying a pixel value of each blue pixel point of the blue image by the adjustment parameter to generate a modified blue image, and projecting the modified blue image on the projection area by the projection lens;

capturing a second image from the projection area, and dividing the second image to a second red picture, a second green picture, and a second blue picture;

calculating a ratio r2 of black pixel points to all pixel points in the second red picture, a ratio g2 of black pixel points to all pixel points in the second green picture, and a ratio b2 of white pixel points to all pixel points in the second blue picture;

checking whether a sum of the ratios r1, g1 and b1 is less than a sum of the ratios r2, g2 and b2;

upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or upon the condition that the sum of the ratios r1, g1 and b1 is not less than the sum of the ratios r2, g2 and b2, decreasing the adjustment parameter by the multiple value to generate the third improvement factor.

4. A method for improving color of a projected image using a projector, the method comprising:

calculating a first improvement factor for compensating a red difference between an original image stored in a storage system of the projector and the projected image, wherein the calculation of the first improvement factor comprises: reading a red image from the storage system, and projecting the red image on the projection area using the projection lens; capturing a first image from the projection area, and dividing the first image to a first red picture, a first green picture, and a first blue picture; calculating a ratio r1 of white pixel points to all pixel points in the first red picture, a ratio g1 of black pixel points to all pixel points in the first green picture, and a ratio b1 of black pixel points to all pixel points in the first blue picture; determining an initial multiple value of an adjustment parameter for adjusting red pixel points of the red image; multiplying a pixel value of each red pixel point of the red image by the adjustment parameter to generate a modified red image, and projecting the modified red image on the projection area by the projection lens; capturing a second image from the projection area, and dividing the second image to a second red picture, a second green picture, and a second blue picture; calculating a ratio r2 of white pixel points to all pixel points in the second red picture, a ratio g2 of black pixel points to all pixel points in the second green picture, and a ratio b2 of black pixel points to all pixel points in the second blue picture; checking whether a sum of the ratios r1, g1 and b1 is less than a sum of the ratios r2, g2 and b2; upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, and increasing the adjustment parameter by the multiple value; upon the condition that the sum of the ratios r1, g1 and b1 is not less than the sum of the ratios r2, g2 and b2, decreasing the adjustment parameter by the multiple value to generate the first improvement factor;

calculating a second improvement factor for compensating a green difference between the original image and the projected image;

calculating a third improvement factor for compensating a blue difference between the original image and the projected image;

obtaining the original image from the storage system, dividing the original image into a red picture, a green picture and a blue picture according to an RGB (red, green, and blue) value of each pixel point of the original image;

multiplying a pixel value of each pixel point of the red picture by the first improvement factor to obtain an improved red picture;

multiplying a pixel value of each pixel point of the green picture by the second improvement factor to obtain an improved green picture;

multiplying a pixel value of each pixel point of the blue picture by the third improvement factor to obtain an improved blue picture;

combining the improved red picture, the improved green picture and the improved blue picture to generate a combined image; and projecting the combined image on a projection area using the projector, to obtain the projected image having the similar color to the original image.

5. The method according to claim 4, wherein the step of calculating the second improvement factor comprises:
    reading a green image from the storage system, and projecting the green image on the projection area using the projector;
    capturing a first image from the projection area, and dividing the first image to a first red picture, a first green picture, and a first blue picture;
    calculating a ratio r1 of black pixel points to all pixel points in the first red picture, a ratio g1 of white pixel points to all pixel points in the first green picture, and a ratio b1 of black pixel points to all pixel points in the first blue picture;
    determining an initial a multiple value of an adjustment parameter for adjusting green pixel points of the green image;
    multiplying a pixel value of each green pixel point of the green image by the adjustment parameter to generate a modified green image, and projecting the modified green image on the projection area using the projector;
    capturing a second image from the projection area, and dividing the second image to a second red picture, a second green picture, and a second blue picture;
    calculating a ratio r2 of black pixel points to all pixel points in the second red picture, a ratio g2 of white pixel points to all pixel points in the second green picture, and a ratio b2 of black pixel points to all pixel points in the second blue picture;
    checking whether a sum of the ratios r1, g1 and b1 is less than a sum of the ratios r2, g2 and b2;
    upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or
    upon the condition that the sum of the ratios r1, g1 and b1 is not less than the sum of the ratios r2, g2 and b2, decreasing the adjustment parameter by the multiple value to obtain the second improvement factor.

6. The method according to claim 4, wherein the step of calculating the third improvement factor comprises:
    reading a blue image from the storage system, and projecting the blue image on the projection area using the projector;
    capturing a first image from the projection area, and dividing the first image to a first red picture, a first green picture, and a first blue picture;
    calculating a ratio r1 of black pixel points to all pixel points in the first red picture, a ratio g1 of black pixel points to all pixel points in the first green picture, and a ratio b1 of white pixel points to all pixel points in the first blue picture;
    determining an initial multiple value of an adjustment parameter for adjusting blue pixel points of the blue image;
    multiplying a pixel value of each blue pixel point of the blue image by the adjustment parameter to generate a modified blue image, and projecting the modified blue image on the projection area using the projector;
    capturing a second image from the projection area, and dividing the second image to a second red picture, a second green picture, and a second blue picture;
    calculating a ratio r2 of black pixel points to all pixel points in the second red picture, a ratio g2 of black pixel points to all pixel points in the second green picture, and a ratio b2 of white pixel points to all pixel points in the second blue picture;
    checking whether a sum of the ratios r1, g1 and b1 is less than a sum of the ratios r2, g2 and b2;
    upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or
    upon the condition that the sum of the ratios r1, g1 and b1 is not less than the sum of the ratios r2, g2 and b2, decreasing the adjustment parameter by the multiple value to obtain the third improvement factor.

7. A non-transitory storage medium having stored thereon instructions that, when executed by at least one microprocessor of a projector, causes the microprocessor to perform a method for improving color of a projected image using the projector, the method comprising:
    calculating a first improvement factor for compensating a red difference between an original image stored in the storage system of the projector and the projected image;
    calculating a second improvement factor for compensating a green difference between the original image and the projected image, wherein the calculation of the first improvement factor comprises: reading a red image from the storage system, and projecting the red image on the projection area using the projection lens; capturing a first image from the projection area, and dividing the first image to a first red picture, a first green picture, and a first blue picture; calculating a ratio r1 of white pixel points to all pixel points in the first red picture, a ratio g1 of black pixel points to all pixel points in the first green picture, and a ratio b1 of black pixel points to all pixel points in the first blue picture; determining an initial multiple value of an adjustment parameter for adjusting red pixel points of the red image; multiplying a pixel value of each red pixel point of the red image by the adjustment parameter to generate a modified red image, and projecting the modified red image on the projection area by the projection lens; capturing a second image from the projection area, and dividing the second image to a second red picture, a second green picture, and a second blue picture; calculating a ratio r2 of white pixel points to all pixel points in the second red picture, a ratio g2 of black pixel points to all pixel points in the second green picture, and a ratio b2 of black pixel points to all pixel points in the second blue picture; checking whether a sum of the ratios r1, g1 and b1 is less than a sum of the ratios r2, g2 and b2; upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, and increasing the adjustment parameter by the multiple value; upon the condition that the sum of the ratios r1, g1 and b1 is not less than the sum of the ratios r2, g2 and b2, decreasing the adjustment parameter by the multiple value to generate the first improvement factor;
    calculating a third improvement factor for compensating a blue difference between the original image and the projected image;
    obtaining the original image from the storage system, dividing the original image into a red picture, a green picture and a blue picture according to an RGB (red, green, and blue) value of each pixel point of the original image;

multiplying a pixel value of each pixel point of the red picture by the first improvement factor to obtain an improved red picture;

multiplying a pixel value of each pixel point of the green picture by the second improvement factor to obtain an improved green picture;

multiplying a pixel value of each pixel point of the blue picture by the third improvement factor to obtain an improved blue picture; and combining the improved red picture, the improved green picture and the improvement blue picture to generate a combined image; and projecting the combined image on a projection area using the projector, to obtain the projected image having the similar color to the original image.

8. The storage medium according to claim 7, wherein the step of calculating the second improvement factor comprises:

reading a green image from the storage system, and projecting the green image on the projection area using the projection lens;

capturing a first image from the projection area, and dividing the first image to a first red picture, a first green picture, and a first blue picture;

calculating a ratio r1 of black pixel points to all pixel points in the first red picture, a ratio g1 of white pixel points to all pixel points in the first green picture, and a ratio b1 of black pixel points to all pixel points in the first blue picture;

determining an initial multiple value of an adjustment parameter for adjusting green pixel points of the green image;

multiplying a pixel value of each green pixel point of the green image by the adjustment parameter to generate a modified green image, and projecting the modified green image on the projection area by the projection lens;

capturing a second image from the projection area, and dividing the second image to a second red picture, a second green picture, and a second blue picture;

calculating a ratio r2 of black pixel points to all pixel points in the second red picture, a ratio g2 of white pixel points to all pixel points in the second green picture, and a ratio b2 of black pixel points to all pixel points in the second blue picture;

checking whether a sum of the ratios r1, g1 and b1 is less than a sum of the ratios r2, g2 and b2;

upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or upon the condition that the sum of the ratios r1, g1 and b1 is not less than the sum of the ratios r2, g2 and b2, decreasing the adjustment parameter by the adjustment parameter to generate the second improvement factor.

9. The storage medium according to claim 7, wherein the step of calculating the third improvement factor comprises:

reading a blue image from the storage system, and projecting the blue image on the projection area using the projection lens;

capturing a first image from the projection area, and dividing the first image to a first red picture, a first green picture, and a first blue picture;

calculating a ratio r1 of black pixel points to all pixel points in the first red picture, a ratio g1 of black pixel points to all pixel points in the first green picture, and a ratio b1 of white pixel points to all pixel points in the first blue picture;

determining an initial multiple value of an adjustment parameter for adjusting blue pixel points of the blue image;

multiplying a pixel value of each blue pixel point of the blue image by the adjustment parameter to generate a modified blue image, and projecting the modified blue image on the projection area by the projection lens;

capturing a second image from the projection area, and dividing the second image to a second red picture, a second green picture, and a second blue picture;

calculating a ratio r2 of black pixel points to all pixel points in the second red picture, a ratio g2 of black pixel points to all pixel points in the second green picture, and a ratio b2 of white pixel points to all pixel points in the second blue picture;

checking whether a sum of the ratios r1, g1 and b1 is less than a sum of the ratios r2, g2 and b2;

upon the condition that the sum of the ratios r1, g1 and b1 is less than the sum of the ratios r2, g2 and b2, saving the ratio r2 as the ratio r1, saving the ratio g2 as the ratio g1, saving the ratio b2 as the ratio b1, increasing the adjustment parameter by the multiple value, and repeating from the multiplying step to the checking step; or upon the condition that the sum of the ratios r1, g1 and b1 is not less than the sum of the ratios r2, g2 and b2, decreasing the adjustment parameter by the multiple value to obtain the third improvement factor.

* * * * *